(12) United States Patent
Gallion et al.

(10) Patent No.: US 7,429,133 B2
(45) Date of Patent: Sep. 30, 2008

(54) INSTRUMENTED ANTIFRICTION BEARING AND ELECTRICAL MOTOR EQUIPPED THEREWITH

(75) Inventors: Samuel Gallion, Tours (FR); Franck Lauferon, Sonzay (FR)

(73) Assignee: Aktiebolaget SKF, Göteborg (SE)

( * ) Notice: Subject to any disclaimer, the term of this patent is extended or adjusted under 35 U.S.C. 154(b) by 220 days.

(21) Appl. No.: 10/520,384

(22) PCT Filed: Jun. 27, 2003

(86) PCT No.: PCT/FR03/01985

§ 371 (c)(1),
(2), (4) Date: Dec. 8, 2005

(87) PCT Pub. No.: WO2004/005937

PCT Pub. Date: Jan. 15, 2004

(65) Prior Publication Data

US 2006/0104558 A1    May 18, 2006

(30) Foreign Application Priority Data

Jul. 2, 2002 (FR) .................................. 02 08263

(51) Int. Cl.
*F16C 41/04* (2006.01)
(52) U.S. Cl. ...................................... 384/448
(58) Field of Classification Search ......... 384/446–448, 384/544; 324/172–174, 168, 207.21, 207.22, 324/207.25; 340/682, 870.3, 870.16, 870.31; 310/160
See application file for complete search history.

(56) References Cited

U.S. PATENT DOCUMENTS

| 4,029,186 A | 6/1977 | De Gennes |
| 4,046,238 A | 9/1977 | Mendoza-Orozco |

(Continued)

FOREIGN PATENT DOCUMENTS

DE    4228899    3/1994

(Continued)

OTHER PUBLICATIONS

Preliminary Search Report for FR 0208263, mailed Feb. Mar. 27, 2003 (2 pages).

(Continued)

*Primary Examiner*—Marcus Charles
(74) *Attorney, Agent, or Firm*—Meyertons, Hood, Kivlin, Kowert & Goetzel, P.C.; Eric B. Meyertons

(57) ABSTRACT

An instrumented ball-bearing includes a rotating part, a non-rotating part, and an assembly for detecting rotation parameters. The assembly for detecting rotation parameters includes an encoder and a sensor. The sensor is integrated with the non-rotating part. The sensor includes a sensor unit and at least a microcoil. The microcoil has a substantially planar winding. The microcoil is positioned in the sensor unit of the non-rotating part such that the microcoil is positioned axially opposite the encoder.

18 Claims, 4 Drawing Sheets

U.S. PATENT DOCUMENTS

| | | | |
|---|---|---|---|
| 4,319,220 A | 3/1982 | Pappas et al. | |
| 4,478,595 A | 10/1984 | Hayakawa et al. | |
| 4,601,374 A | 7/1986 | Ladin | |
| 4,608,741 A | 9/1986 | Mallet | |
| 4,641,523 A | 2/1987 | Andreasson | |
| 4,699,530 A | 10/1987 | Satoh et al. | |
| 4,732,494 A * | 3/1988 | Guers et al. | 384/448 |
| 4,778,286 A * | 10/1988 | Kadokawa | 384/446 |
| 4,815,867 A | 3/1989 | Ladin | |
| 4,854,436 A | 8/1989 | Lassiaz et al. | |
| 4,874,073 A | 10/1989 | Tagawa | |
| 4,881,629 A | 11/1989 | Gay et al. | |
| 4,946,295 A | 8/1990 | Hajzler | |
| 4,957,133 A | 9/1990 | Linz et al. | |
| 5,008,647 A | 4/1991 | Brunt et al. | |
| 5,018,384 A | 5/1991 | Hayashi et al. | |
| 5,033,013 A | 7/1991 | Kato et al. | |
| 5,264,790 A | 11/1993 | Moretti et al. | |
| 5,372,435 A | 12/1994 | Genero et al. | |
| 5,575,568 A | 11/1996 | Rigaux et al. | |
| 5,592,401 A | 1/1997 | Kramer | |
| 5,598,913 A | 2/1997 | Monahan et al. | |
| 5,713,577 A | 2/1998 | Lannert et al. | |
| 5,721,539 A | 2/1998 | Goetzl | |
| 5,762,425 A * | 6/1998 | Ouchi | 384/448 |
| 5,780,731 A | 7/1998 | Matsui et al. | |
| 5,845,230 A | 12/1998 | Lamberson | |
| 5,865,288 A | 2/1999 | Thomire et al. | |
| 5,877,431 A | 3/1999 | Hirano | |
| 5,898,388 A * | 4/1999 | Hofmann et al. | 384/448 |
| 6,002,248 A * | 12/1999 | Binder | 324/160 |
| 6,011,491 A | 1/2000 | Goetzl | |
| 6,013,007 A | 1/2000 | Root et al. | |
| 6,035,990 A | 3/2000 | Peschke | |
| 6,043,643 A * | 3/2000 | Message et al. | 324/174 |
| 6,056,446 A | 5/2000 | Welter et al. | |
| 6,094,046 A * | 7/2000 | Message et al. | 324/173 |
| 6,109,624 A | 8/2000 | Message et al. | |
| 6,160,480 A | 12/2000 | Su-yueh | |
| 6,196,552 B1 | 3/2001 | Peterson et al. | |
| 6,267,512 B1 | 7/2001 | Beghini et al. | |
| 6,323,640 B1 | 11/2001 | Forestiero et al. | |
| 6,338,576 B1 * | 1/2002 | Girardin et al. | 384/448 |
| 6,415,900 B1 | 7/2002 | Lopez et al. | |
| 6,539,336 B1 | 3/2003 | Vock et al. | |
| 6,559,633 B1 * | 5/2003 | Nachtigal et al. | 324/174 |
| 6,595,692 B2 * | 7/2003 | Itou | 384/448 |
| 6,611,138 B2 | 8/2003 | Vasiloiu | |
| 6,612,749 B2 | 9/2003 | Arnault et al. | |
| 6,655,844 B1 * | 12/2003 | Message et al. | 384/448 |
| 6,666,784 B1 | 12/2003 | Iwamoto et al. | |
| 6,746,352 B1 | 6/2004 | Poiret et al. | |
| 6,821,021 B2 * | 11/2004 | Message et al. | 384/448 |
| 6,908,229 B2 | 6/2005 | Landrieve et al. | |
| 2002/0054719 A1 * | 5/2002 | Takizawa et al. | 384/448 |
| 2002/0181815 A1 * | 12/2002 | Beauprez | 384/448 |
| 2003/0002764 A1 | 1/2003 | Pflugner et al. | |
| 2003/0007631 A1 | 1/2003 | Bolognesi et al. | |
| 2004/0013334 A1 * | 1/2004 | Landrieve et al. | 384/448 |
| 2004/0141669 A1 | 7/2004 | Landrieve et al. | |
| 2004/0154895 A1 | 8/2004 | Thomire et al. | |
| 2004/0202392 A1 | 10/2004 | Niarfeix et al. | |
| 2005/0008276 A1 | 1/2005 | Beghini et al. | |
| 2005/0011717 A1 | 1/2005 | Arnault | |
| 2005/0011718 A1 | 1/2005 | Arnault | |
| 2005/0089255 A1 | 4/2005 | Debrailly et al. | |
| 2005/0124447 A1 | 6/2005 | Message et al. | |
| 2005/0165397 A1 | 7/2005 | Faus et al. | |
| 2005/0235513 A1 | 10/2005 | Niarfeix | |
| 2005/0265646 A1 | 12/2005 | Arnault | |
| 2006/0011445 A1 | 1/2006 | Bussit et al. | |

FOREIGN PATENT DOCUMENTS

| | | |
|---|---|---|
| DE | 9418459 | 2/1995 |
| DE | 29708535 | 8/1997 |
| DE | 19637585 | 3/1998 |
| DE | 19809074 | 1/1999 |
| DE | 10011820 | 9/2001 |
| DE | 10042677 | 3/2002 |
| DE | 10148388 | 4/2003 |
| EP | 399855 | 11/1990 |
| EP | 0511105 | 10/1992 |
| EP | 0520853 | 12/1992 |
| EP | 0553716 | 8/1993 |
| EP | 806581 | 11/1997 |
| EP | 823267 | 2/1998 |
| EP | 0930505 | 7/1999 |
| EP | 0992797 | 4/2000 |
| EP | 1037051 | 9/2000 |
| EP | 1146244 | 10/2001 |
| EP | 1164358 | 12/2001 |
| FR | 2 375 484 | 12/1977 |
| FR | 2577291 | 8/1986 |
| FR | 2602872 | 2/1988 |
| FR | 2611244 | 8/1988 |
| FR | 2655735 | 6/1991 |
| FR | 2688560 | 9/1993 |
| FR | 2 744 506 | 8/1997 |
| FR | 2754903 | 4/1998 |
| FR | 2772444 | 6/1999 |
| FR | 2813644 | 3/2002 |
| FR | 2819864 | 7/2002 |
| GB | 1580402 | 12/1980 |
| GB | 2054084 | 12/1981 |
| GB | 2156082 | 10/1985 |
| GB | 2201745 | 9/1988 |
| WO | 9850709 | 11/1998 |
| WO | 0142809 | 5/2001 |
| WO | 02052163 | 7/2002 |
| WO | 02052280 | 7/2002 |
| WO | 03065051 | 8/2003 |
| WO | 04005937 | 1/2004 |

OTHER PUBLICATIONS

Allan, Roger, "Coil-Based Micromachined Sensor Measures Speed and Position for Automotive Applications", Electronic Design, Penton Publishing, Cleveland, OH, US, vol. 44, No. 26, Dec. 16, 1996, pp. 34, 35, and 37.

International Search Report for PCT/FR 03/00264 mailed on May 28, 2003 (2 pages).

International Search Report for PCT/FR 02/00359 mailed on Jul. 3, 2003 (5 pages).

French Search Report for FR 0302363 mailed on Oct. 6, 2003 (2 pages).

European Search Report for EP 04290379, research completed on May 19, 2004 (2 pages).

Rapport D'Examen Preliminaire International for PCT/FR02/00359, Date d'achevement du present rapport Dec. 13, 2002 (6 pages).

Rapport D'Examen Preliminaire International for PCT/FR03/00264, Date d'achevement du present rapport Jul. 28, 2003 (5 pages).

U.S. Appl. No. 10/520,384, filed Jan. 3, 2005, "Instrumented Antifriction Bearing and Electrical Motor Equipped Therewith" Gallion et al. available in private Pair.

U.S. Appl. No. 10/548,866, filed Sep. 9, 2005, "Sensor Unit, and Housing Relay for the Production of Said Unit" to Landrieve, available in privated Pair.

U.S. Appl. No. 10/551,167, filed Sep. 27, 2005, "Portable Measuring Device for use in Sport" to Franck, available in private Pair.

U.S. Appl. No. 10/552,375, filed Jan. 18, 2005, "Freewheel Bearing Device and Freewheel Pulley" to Girardin, available in private pair.

U.S. Appl. No. 10/562,476, filed Dec. 21, 2005, "Bearing Support with an Instrumented Movement and Coder for an Information Recorder Unit" to Gallion et al., available in privated Pair.
English translation of DE 10011820 (1 page).
English translation of DE 10042677 (1 page).
English translation of DE 10148388 (1 page).
English translation of DE 19637585 (1 page).
English translation of DE 29708535 (1 page).
English translation of EP 399855 (1 page).
English translation of EP 520853 (1 page).
English translation of EP 823267 (1 page).
English translation of FR 2577291 (1 page).
English translation of FR 2602872 (1 page).
English translation of FR 2611244 (1 page).
English translation of FR 2655735 (1 page).
English translation of FR 2688560 (1 page).
English translation of FR 2772444 (1 page).
English translation of FR 2819864 (1 page).

* cited by examiner

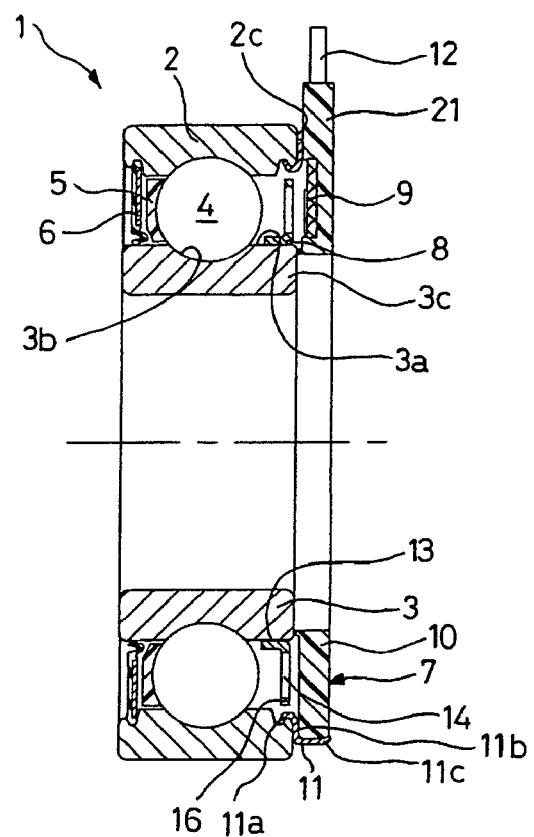
FIG_1
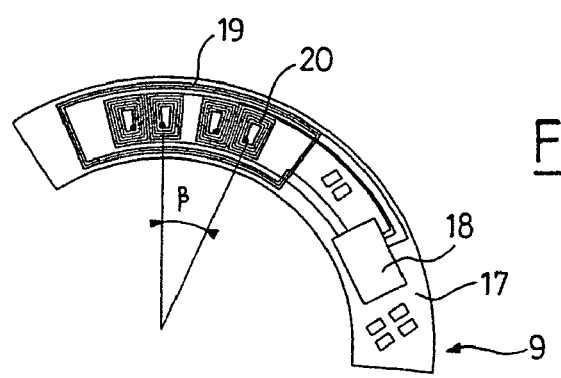
FIG_2

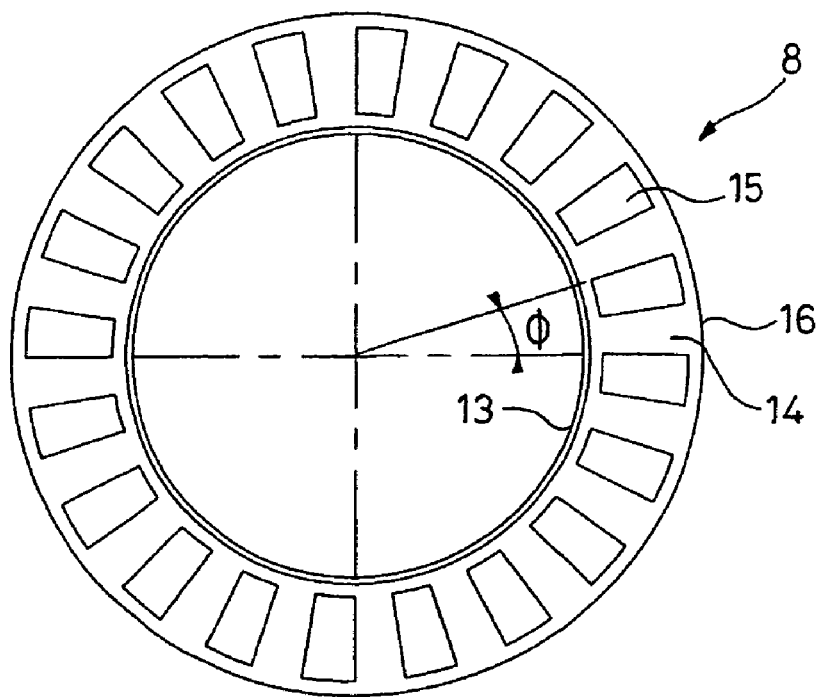
FIG_3
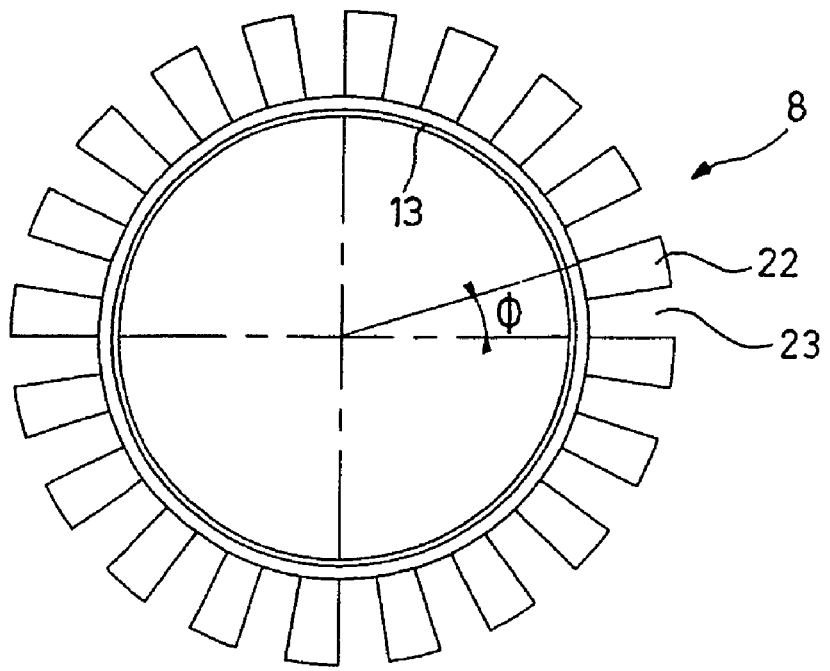
FIG_4

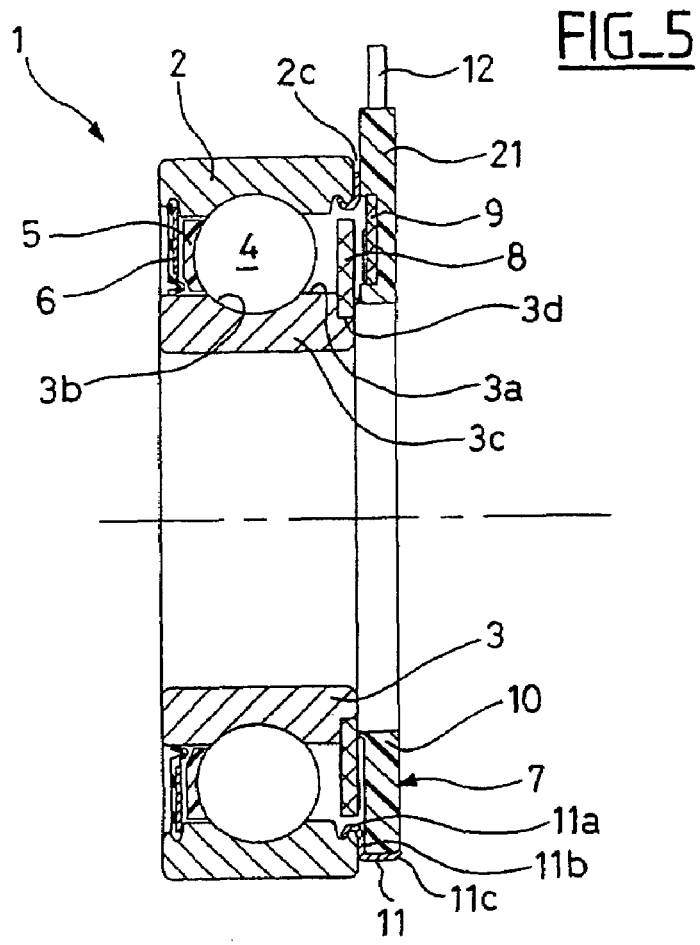
FIG_5
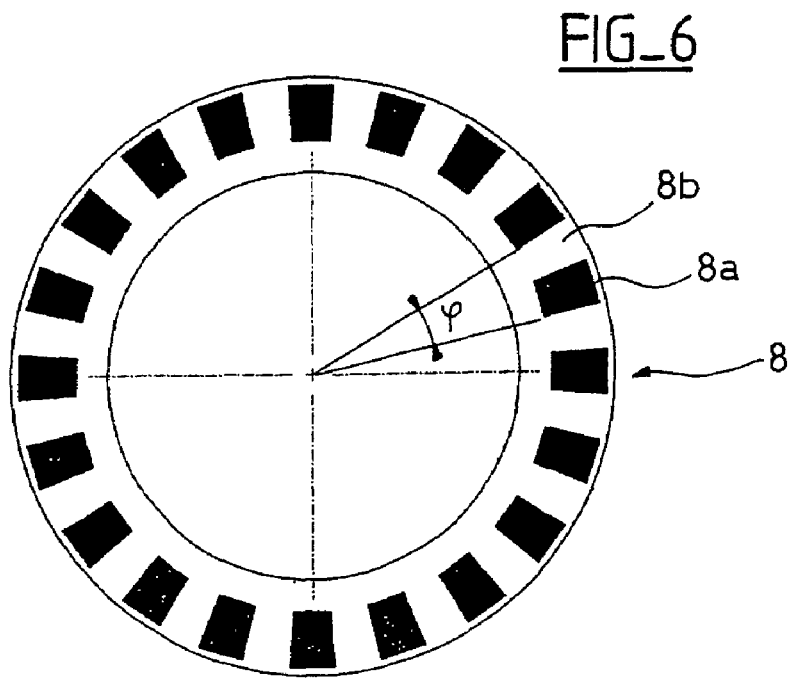
FIG_6

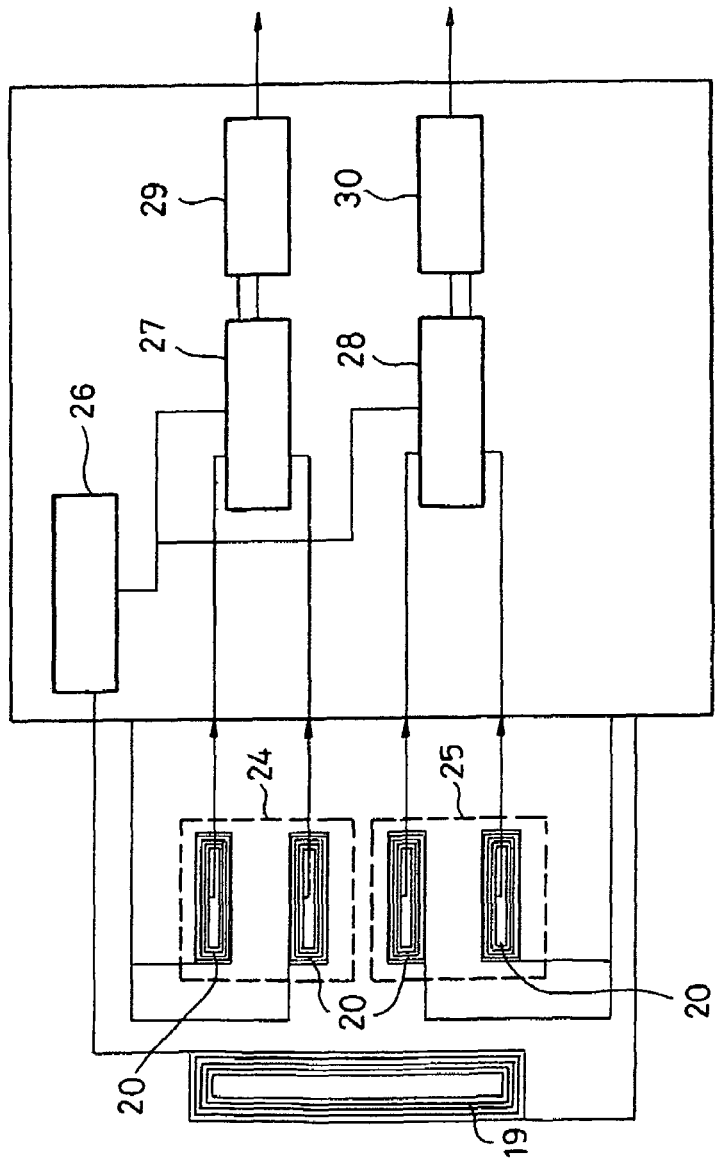

INSTRUMENTED ANTIFRICTION BEARING AND ELECTRICAL MOTOR EQUIPPED THEREWITH

BACKGROUND OF THE INVENTION

1. Field of the Invention

The present invention generally relates to an antifriction bearing in which a rotating member of the bearing supports an encoder and a nonrotating member of the bearing supports a sensor that may be used to determine rotation parameters such as the speed or the angular position of the rotating element supporting the encoder. The present invention also relates to antifriction bearings for use in electric motors, which are required to operate in severe speed and temperature conditions.

2. Description of the Relevant Art

French Patent No. 2,754,903, describes an antifriction bearing that includes a sensor on the nonrotating track, of the Hall effect probe type, and an encoder on the rotating track moving in rotation with a slight air gap relative to the sensor while being capable of producing in the sensor a periodic signal with a frequency proportional to the rotation speed of rotation of the rotating track. The encoder includes an annular active portion. The annular active portion includes a plastic magnet and an active portion placed opposite the sensor. The active portion may be supplemented by a reinforcement portion that includes two annular elements placed in contact with the active portion on either side of the active zone.

This type of antifriction bearing is usually satisfactory, particularly in the field of electric motors. However, this type of encoder cannot operate at temperatures above 120°. In addition, the sensor and the encoder do not operate satisfactorily if they are subjected to high intensity external magnetic fields, for example the magnetic fields induced by the coils of the stator of electric motors and/or by the electromagnetic brake built into the motors. Finally, the axial compactness of this type of antifriction bearing is not optimal and is not easy to incorporate.

In high power asynchronous electric motors, control of the motor requires detection of the rotation parameters of the motor. Knowledge of speed and direction of rotation of the rotor may be needed to adapt the frequency and the direction of the current entering the coils of the stator. The use of a multipolar type encoder associated with a Hall effect probe is suitable only for applications in which the power and the control requirements are relatively imprecise, for example for a fan motor that operates at constant speed during use. Optical type sensor encoder systems, such as industrial encoders, require a mechanical interface for driving by the electric motor and are relatively sensitive to impacts and to temperature. Optical type sensor encoder systems are not likely to be built into a motor.

The invention aims to remedy these disadvantages.

SUMMARY

Herein we describe an instrumented antifriction bearing that may be axially compact and may operate at high temperatures while delivering precise detection. The antifriction bearing may also including when they are subjected to intense magnetic fields.

In some embodiments, the instrumented antifriction bearing device may include a rotating portion, a nonrotating portion and an assembly for detecting rotation parameters. An assembly for detecting rotation parameters may include an encoder and a sensor. A sensor may be integrated with the nonrotating portion and may include a sensor unit. A sensor may include at least one microcoil with a substantially flat winding. A microcoil may be positioned on a support of a circuit mounted in the sensor unit of the nonrotating portion so that the microcoil may be axially opposite the encoder. This may provide satisfactory axial compactness.

In one embodiment, the device may include a plurality of substantially radial coplanar reception microcoils, which may allow substantially precise detection. In certain embodiments, the device may include a plurality of reception microcoils positioned on a plurality of parallel radial planes. An increased number of reception coils may provide enhanced precision.

In some embodiments, the device may include a transmission coil positioned in the sensor unit. The transmission coil may also be a microcoil. A microcoil may have a flat winding. In an embodiment, a device may include at least one transmission coil, at least one reception coil, and a data processing circuit positioned on the support. These elements may be used to retain a desired axial compactness. The coils may be made using printed circuit technology. The support may include a printed circuit substrate in the form of a resin circuit board. A sensor may include active and/or passive elements combined in a single module integrated with the nonrotating portion.

In some embodiments, the device may include a plurality of microcoils. Microcoils may be coupled in pairs and/or angularly offset in order to generate a differential signal. The encoder may include an encoder wheel. An encoder wheel may include an active zone made of an electrically conducting metal. In certain embodiments, the encoder may include a printed circuit with an annular shaped substrate that includes metallized sectors and nonmetallized sectors. The printed circuit may be mounted on a nonrotating track of the antifriction bearing.

In some embodiments, the encoder may include an encoder wheel with windows and/or teeth attached to a rotating track of the antifriction bearing. The encoder may be a substantially solid block. The encoder may be pressed sheet metal. An encoder may operate at high temperatures. For the purposes of this application, windows refer to holes formed in the encoder between two circumferentially continuous portions. For the purposes of this application, teeth refer to portions of material that are integrated with a circumferentially continuous portion of the encoder. The encoder may include an axial portion positioned on a cylindrical bearing surface of the rotating track and a radial portion directed towards the other track and in which the windows or the teeth are formed.

To increase compactness, at least one portion of the encoder may be positioned in the space situated between the antifriction bearing tracks. For example, a portion of the encoder may be positioned radially between the cylindrical surfaces of the tracks which extend between the bearing raceways and the frontal surfaces delimiting said tracks and axially, at right angles to the cylindrical surfaces, between the rolling elements and the frontal radial surfaces of the antifriction bearing tracks. In certain embodiments, the encoder may be positioned outside the space situated between the antifriction bearing tracks.

In some embodiments, the sensor unit may be annular. In another embodiment, the sensor unit may occupies an angular sector of less than 360°, for example approximately 120°. In certain embodiments, the data processing circuit may be an application-specific integrated circuit (ASIC).

In some embodiments, an electric motor may include a rotor, a stator, at least one antifriction bearing supporting the rotor, and a sensor assembly including an encoder and a sensor. The sensor may include at least one microcoil with a substantially flat winding positioned on a support of a circuit that is mounted in the sensor unit and integrated with the stator such that the microcoil is positioned axially opposite the encoder. In an embodiment, a winding may include an outer track integral with the stator and supporting the sensor unit and an inner rotating track integral with the rotor and supporting the encoder. The motor may be of the high power asynchronous type in which precise control may be required and facilitated by measuring the rotation parameters precisely. For the purposes of this application, a microcoil refers to a coil with a winding formed on a circuit. For example, a microcoil may include a copper coil on a printed circuit substrate. The thickness of the card and the microcoil may be approximately 1 mm.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which:

FIG. 1 depicts a view of an axial section of an embodiment of an instrumented antifriction bearing;

FIG. 2 depicts a partial view of the sensor of FIG. 1;

FIG. 3 depicts a frontal view in elevation of the encoder of FIG. 1;

FIG. 4 depicts a frontal view in elevation of an embodiment of an encoder variant;

FIG. 5 depicts a view of an axial section of an embodiment of an instrumented antifriction bearing;

FIG. 6 depicts a frontal view in elevation of the encoder of FIG. 5; and

FIG. 7 depicts a wiring diagram of an embodiment of a sensor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

As illustrated in FIG. 1, the rolling bearing 1 may include an outer track 2; an inner track 3; a row of rolling elements 4, such as balls, placed between the outer track 2 and the inner track 3 and retained by a cage 5; a seal 6 on one of its sides; on the opposite side a speed sensor 5 integrated with the outer track 2; and an encoder 8 integrated with the inner track 3. In an embodiment, the outer track may be nonrotating and the inner track may be rotating. In an embodiment, the outer track may be rotating and the inner track may be rotating.

In some embodiments, a sensor 7 may include a detection portion 9 as depicted in greater detail in FIG. 2. A sensor may include a support unit 10 made of a synthetic material and a metal element 11 fitted onto a bearing surface of the outer track 2. A groove in a track may be used to attach the seal provided in noninstrumented antifriction bearings. A cable 12 may be coupled to the detection portion 9 and may be used to transmit information about speed, position, and/or rotation parameters. Information may be transmitted to any unit that are capable of exploiting the data.

In some embodiments, an encoder 8, as depicted in FIGS. 1 and 3, may include a support portion 13 and an operational portion 14. The support portion 13 may be tubular in shape. The support portion 13 may be positioned on a cylindrical bearing surface 3a of the inner track 3 formed between the trackway 3b which is coupled with the rolling elements 4 and a radial surface 3c which forms the end of the inner track 3 in the axial direction on the side of the sensor. The operational portion 14 may be radial and may include a plurality of windows 15. Windows may have a rectangular shape and may be elongated radially at the large diameter end of the operational portion 14, allowing a continuous circular portion 16 to remain. The operational portion 14 and the support portion 13 may be a solid unit and may provide an economic and particularly robust construction. The encoder 8 may be a metal sheet formed by means of pressing and punching steps. The operational portion 14 may be slightly recessed relative to the radial surface 3c of the inner track 3. The encoder 8 may be particularly compact and positioned in the space defined radially between the tracks 2 and 3 of the rolling bearing and axially between the rolling elements 4 and the radial plane through which the end surfaces 2c, 3c of said tracks 2 and 3 pass.

In some embodiments, a detection portion 9 of the sensor 7 may include a support 17, a transmission microcoil 19, and at least four reception microcoils 20. An integrated circuit 18, such as an ASIC type, may be mounted on a support 17 and may be used to process data. A transmission microcoil 19 may include an excitation coil. The circuit may include a predetermined number of filtering elements such as capacitors, resistors, etc., which are not shown. The detection portion 9 may be positioned axially at a slight distance from the operational portion 14 of the encoder 8 and may occupy an angular sector of approximately 120° while being inserted into the support unit 10, which may be substantially circular. In an embodiment, a continuous angular sector of 360° may be provided for insertion of the detection portion into the support unit. The detection portion 9 may include a face, oriented facing the encoder 8, that is not substantially covered by the material of the support unit 10.

In some embodiments, microcoils 19 and 20 may be flat winding types of microcoils. Microcoils may be printed circuits or integrated circuits. The flatness of the windings may provide the sensor 7 with excellent axial compactness. In addition, the reception coils 20 may have a square outer contour. Reception coils may be positioned one after the other on the arc of a circle formed by the support 17, while the transmission coil 19 substantially surrounds the reception coils 20 and is shaped like an arc of a circle. The coils 19 and 20 may be coupled to the data processing circuit 18. The coils 19 and 20 may be coupled to the cable 12.

A metal element 11 may include a portion that forms a hook 11a bent into a groove of the outer track 2 that may be used for fastening a sealing element which, in a noninstrumented antifriction bearing, may be substantially symmetrical with the seal 6. The metal element 11 may be supplemented by a short radial portion directed outward from the portion 11a and an axial portion 11c extending from the free end of the radial portion 11b. A short radial portion may be in contact on one side with the end radial surface 2c of the outer track 2 and on the other side with the support unit 10 of the sensor 7. An axial portion 11c may radially surround the support unit 10, with the exception of the cable outlet zone 12 where the support unit 10 may extend outward forming a protuberance 21 surrounding the cable 12 and protecting its outlet.

In some embodiments, a support unit 10 may be made of a synthetic material and may have a generally annular shape with the protuberance 21 projecting over its periphery. A support unit may have an axial hollow on its radial face on the side of the antifriction bearing that constitutes a housing for the detection portion 9 while covering the detection portion on its face opposite the rolling bearing and over its thickness in the radial direction. The support unit 10 and the detection portion 9 may be integrated. In one embodiment, the support unit 10 could be metallic.

FIG. 4 depicts an embodiment of an encoder in which the support portion 13 is similar to FIG. 3. The operational portion 14 may be oriented radially outward from the support portion 13. A support portion may be formed by a plurality of teeth 22, which may be substantially rectangular in shape, elongated radially, whose periphery is circular, and crenellations 23 of slightly trapezoidal shape. The reception coils 20 may be electrically excited by the transmission coil 19 connected to an oscillating circuit. The transmission coil 19 may generate by induction an electric signal in the reception coils 20. During the rotation of the encoder 8, the windows and the full portions of the operational portion 14 passing before the microcoils may produce a variation of the metal mass situated in front of each reception microcoil 20. In the reception coils 20, this may result in a variation of the phase of the electric signal induced due to losses by eddy currents. These variations of the electric signal emitted by the various reception coils 20 and processed by the circuit 18 may be the basis of the generation of signals representative of the parameters of rotation of the encoder 8, such as the speed of rotation.

In some embodiments, a sensor with microcoils may allow the instrumented antifriction bearing to deliver reliable information, even when magnetic fields of high intensity are present. The encoder may be made of an electrically conducting and magnetic metal material, such as steel, or electrically conducting and nonmagnetic material, such as aluminum or copper.

Reception microcoils 20 may operate in pairs to deliver a differential signal. The reception microcoils 20 of a pair may be angularly offset by an angle represented by β. An angular pitch of the windows is represented by φ. For the signal to be out of phase, one of these angles may not be a multiple of the other. This therefore gives $β≠a*φ$ where a is any integer, the angle β usually being greater than φ. For example this could be $β=(a+0.5)*φ$ or $β=(a+0.25)*φ$.

When an encoder passes in rotation before the sensor, the discontinuities of material of the operational portion 14 may cause periodic variations of the metal mass that is opposite the reception microcoils 20. If there is metal material before each of the coils of a pair of reception coils, the phase difference between the two differential coils may be zero. If there is metal material before at least one of the two reception coils forming a pair and the metal material is distributed differently before each coil, the losses due to the eddy currents in the metal material may generate a phase difference of the currents. This phase difference may then be processed and extracted adequately by the processing circuit 18, in order to obtain desired information, such as angular speed, direction of rotation, position, etc.

In some embodiments, generation of an electronic signal may not depend on the level or the direction of a magnetic field sensed by the microcoils, but on the modification of the currents induced by the excitation coil 19 in the reception coils 20 in the presence of the variations of the electrically conducting metal masses passing before said microcoils. The signal may be therefore very insensitive to external magnetic fields, which makes the device according to the invention extremely suitable for operating in an environment subjected to strong magnetic fields such as electric motors. The reception coils 20 may be distributed on the support 17 with a radial position and angular pitch suitable for cooperating with the operational portion 14 of the encoder 8 and/or delivering the required signals. In an embodiment, the number of reception coils 20 may be increased in the circumferential direction and/or several coils may be stacked in the axial direction in order to obtain higher powered signals.

In some embodiments, since the microcoils and/or processing circuit 18 may be extremely thin, the sensor 7 may have extremely small axial dimensions, which may allow integration into a sensor unit 10. Likewise, the encoder may be, due to its structure, thin axially and may be easily integrated into the space between the bearing tracks, such that the encoder does not affect the external dimensions of the instrumented antifriction bearing.

FIGS. 5 and 6 depict and embodiment of an encoder 8 made with a printed circuit technique. From a conventional printed circuit substrate coated with a thin metal layer, such as copper, a disk may be made including metallized sectors 8a and nonmetallized sectors 8b. The substrate may be electrically nonconducting and the metallized sectors 8a may be electrically conducting.

A disk may be coupled (e.g., by appropriate means, such as fitment and/or bonding) onto an axial portion 3d the rotating track 3 of the bearing 1. The axial portion 3d may be configured to be coupled to the disk. This type of encoder wheel has little inertia, great axial compactness, and the contours of the active portions may be made with great precision. The aggregate signal may be particularly weak.

FIG. 7 depicts in greater detail the electrical functions of an embodiment of the system. Reception coils 20 may be grouped in two pairs numbered 24 and 25 and framed by dashed lines. For clarity of the drawing, the pairs of reception coils 24 and 25 are shown outside the exciting transmission coil whereas in reality they are inside said transmission coil 19. The coils 19 and 20 may be coupled to the processing circuit 18. The processing circuit 18 may include an oscillator 26, whose output is connected to the transmission coil 19, and two phase demodulators 27 and 28 coupled to the output of each of the reception coils 20. In an embodiment, the circuit 18 may include two interpolating comparators 29, 30, positioned at the output of the phase demodulators 27 and 28. At the output, the processing circuit 18 may transmit a digital signal representative of at least one parameter of rotation of the antifriction bearing, such as speed, position, direction of rotation, acceleration, etc.

In some embodiments, an instrumented antifriction bearing may be produced that can be easily integrated into a mechanical assembly due to its small bulk. The instrumented antifriction bearing may operate at high temperatures, such as those existing in an electric motor, and/or operate in an environment subjected to strong magnetic fields. Through these qualities, the instrumented antifriction bearing according to the invention has worthwhile capabilities for use in a high power asynchronous electric motor. The instrumented antifriction bearing may fulfill both the mechanical function of a bearing and the electronic functions of detection necessary to control the motor.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S.

patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. An instrumented antifriction bearing device comprising:
 a rotating portion;
 a nonrotating portion; and
 an assembly configured to detect rotation parameters, wherein the assembly comprises:
  an encoder;
  a sensor, wherein the sensor is integrated with the nonrotating portion, and wherein the sensor comprises:
   a sensor unit;
   at least one reception microcoil and at least one transmission microcoil, each microcoil being a substantially flat winding,
   wherein said microcoils are positioned on a support of a circuit that is coupled to the sensor unit of the nonrotating portion, and wherein said microcoils are configured to be positioned axially opposite the encoder.

2. The device of claim 1, further comprising a plurality of substantially radial coplanar reception microcoils.

3. The device of claim 2, wherein said microcoils are linked in pairs, and wherein the linking reception microcoils are configured to generate a differential signal.

4. The device of claim 1, wherein the encoder comprises an encoder wheel, and wherein the encoder wheel comprises an active zone, and wherein the active zone comprises an electrically conducting metal.

5. The device of claim 1, wherein the encoder comprises an encoder wheel, and wherein the encoder wheel comprises windows.

6. The device of claim 1, wherein the encoder comprises a printed circuit, and wherein the printed circuit comprises an annular substrate with metallized sectors and nonmetallized sectors.

7. The device of claim 6, wherein the printed circuit is coupled to a rotating track of the antifriction bearing.

8. The device of claim 1, wherein a space is defined between two cylindrical races of the antifriction bearing and frontal surfaces delimiting said races and wherein at least one portion of the encoder is positioned in said space between the antifriction bearing tracks.

9. The device of claim 1, wherein a space is defined between two cylindrical races of the antifriction bearing and frontal surfaces delimiting said races and wherein the encoder is positioned outside said space.

10. The device of claim 1, wherein the sensor unit is substantially annular.

11. The device of claim 1, wherein the sensor unit occupies an angular sector of less than approximately 360.

12. The device of claim 1, wherein the encoder comprises an encoder wheel, and wherein the encoder wheel comprises teeth.

13. The device of claim 1, wherein the encoder comprises a printed circuit, and wherein the printed circuit comprises an annular substrate with metallized sectors and nonmetallized sectors.

14. An electric motor comprising:
 a rotor;
 a stator;
 at least one antifriction bearing, wherein an antifriction bearing is configured to support the rotor; and
 a sensor assembly comprising:
  an encoder; and
  a sensor, integrated with the stator, wherein the sensor comprises:
   at least one reception microcoil and at least one transmission microcoil, wherein each microcoil comprises an essentially flat winding, and wherein said microcoils are positioned on a support of a circuit coupled to the sensor such that said microcoils are positionable axially opposite the encoder.

15. An instrumented antifriction bearing device comprising:
 a rotating portion;
 a nonrotating portion; and
 an assembly configured to detect rotation parameters, wherein the assembly comprises:
  an encoder;
  a sensor, wherein the sensor is integrated with the nonrotating portion, and
  wherein the sensor comprises:
   at least one transmission coil;
   at least one reception coil; and
   a data processing circuit; wherein a transmission coil, a reception coil, and
  a date processing circuit are positioned on a support;
  wherein a reception coil is a substantially flat microcoil winding and said reception coil is configured to be positioned axially opposite the encoder.

16. The device of claim 15, wherein the encoder comprises an encoder wheel, and wherein the encoder wheel comprises an active zone, and wherein the active zone comprises an electrically conducting metal.

17. The device of claim 15, wherein the encoder comprises an encoder wheel, and wherein the encoder wheel comprises windows.

18. The device of claim 15, wherein the encoder comprises an encoder wheel, and wherein the encoder wheel comprises teeth.

* * * * *